United States Patent [19]

Sato

[11] Patent Number: 4,792,215
[45] Date of Patent: Dec. 20, 1988

[54] ZOOM LENS

[75] Inventor: Shigetada Sato, Tokyo, Japan

[73] Assignee: Asahi Kogaku Kogyo Kabushiki Kaisha, Tokyo, Japan

[21] Appl. No.: 569,466

[22] Filed: Jan. 9, 1984

[30] Foreign Application Priority Data

Feb. 2, 1983 [JP] Japan .................................. 58-15885

[51] Int. Cl.$^4$ .............................................. G02B 15/00
[52] U.S. Cl. ..................................... 350/426; 350/427
[58] Field of Search ........................ 350/427, 426, 423

[56] References Cited

U.S. PATENT DOCUMENTS 4,074,931 2/1978 Okudaira .
4,195,912 4/1980 Doi et al. .
4,323,302 4/1982 Kimura .

OTHER PUBLICATIONS

Abstract from Official Gazette, published Apr. 19, 1983, U.S. Pat. No. 4,380,375.
Abstract from Official Gazette, published Nov. 19, 1974, U.S. Pat. No. 3,848,969.

Primary Examiner—John K. Corbin
Assistant Examiner—P. M. Dzierzynski
Attorney, Agent, or Firm—Lyon & Lyon

[57] ABSTRACT

A zoom lens of a compact size and good performance comprises a front diverging lens group and a rear converging lens group which are mechanically movable for variable power, the front diverging lens comprising a first lens of negative meniscus which is convex toward an object, a second negative lens, and a third lens of positive meniscus which is convex toward the object, the rear converging lens comprising a fourth positive lens, a fifth positive lens, a sixth negative lens, and a seventh positive lens, there being an aperture disposed more closely than the rear group to the object and movable with the rear group.

3 Claims, 6 Drawing Sheets

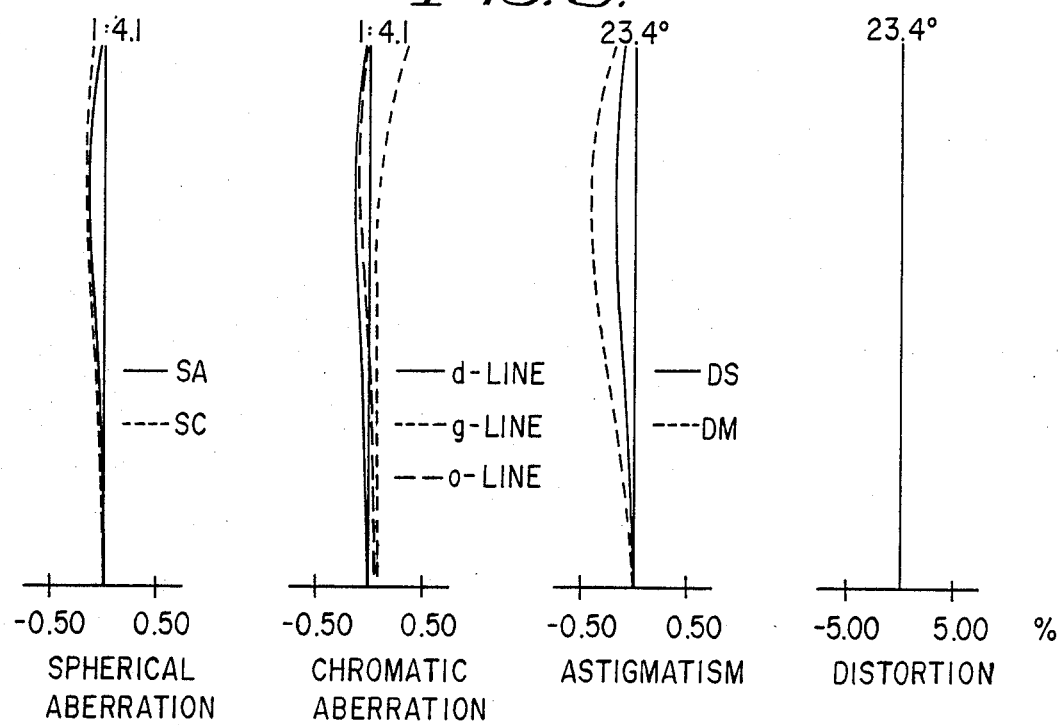
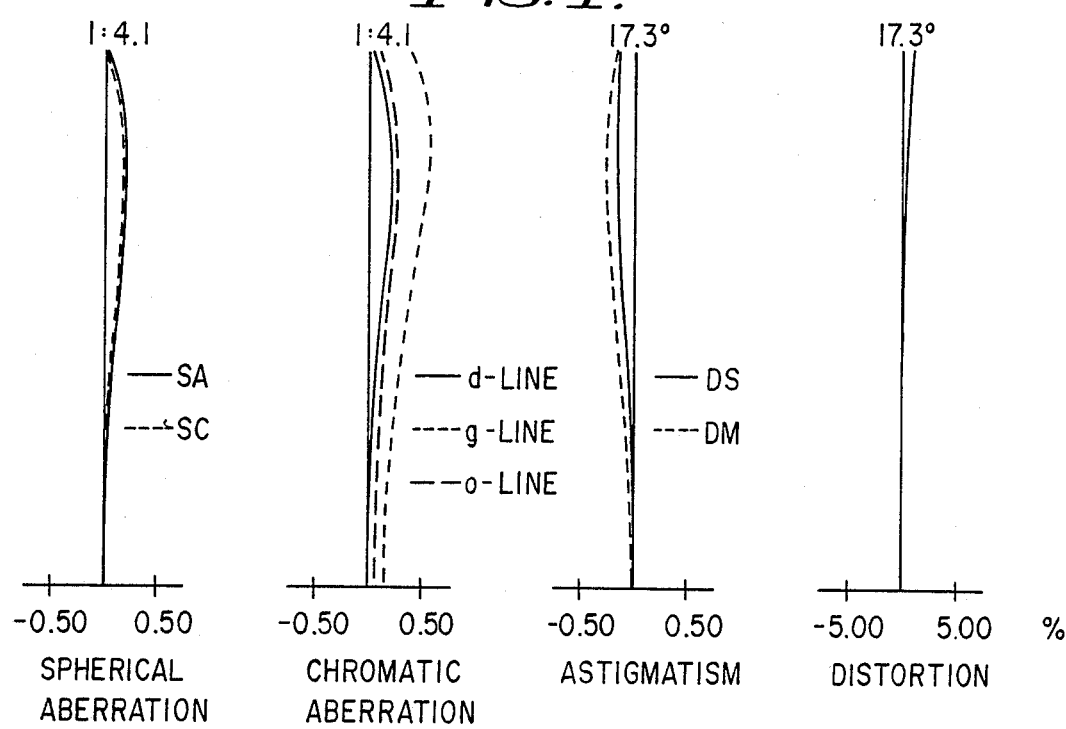

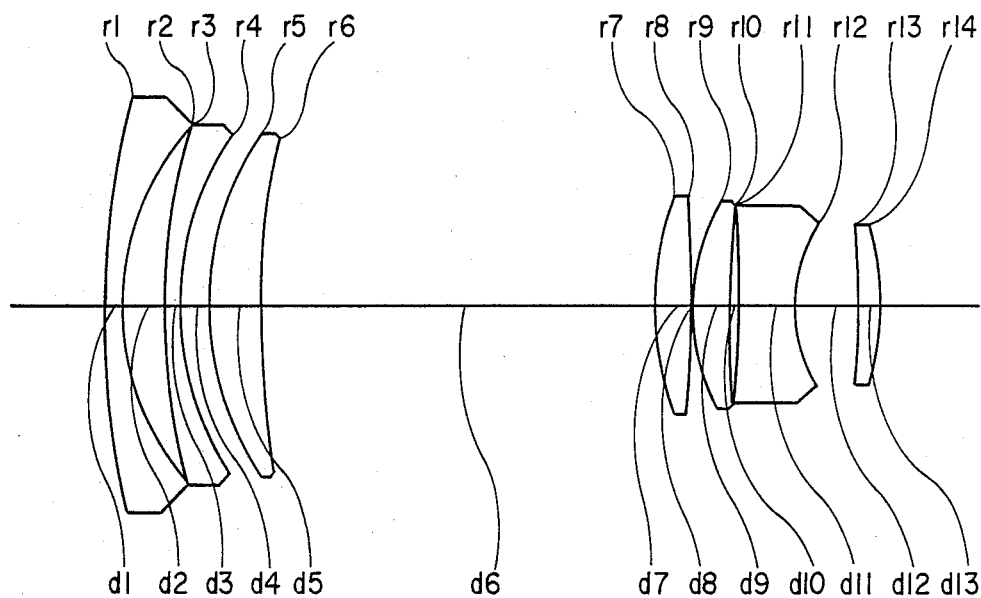
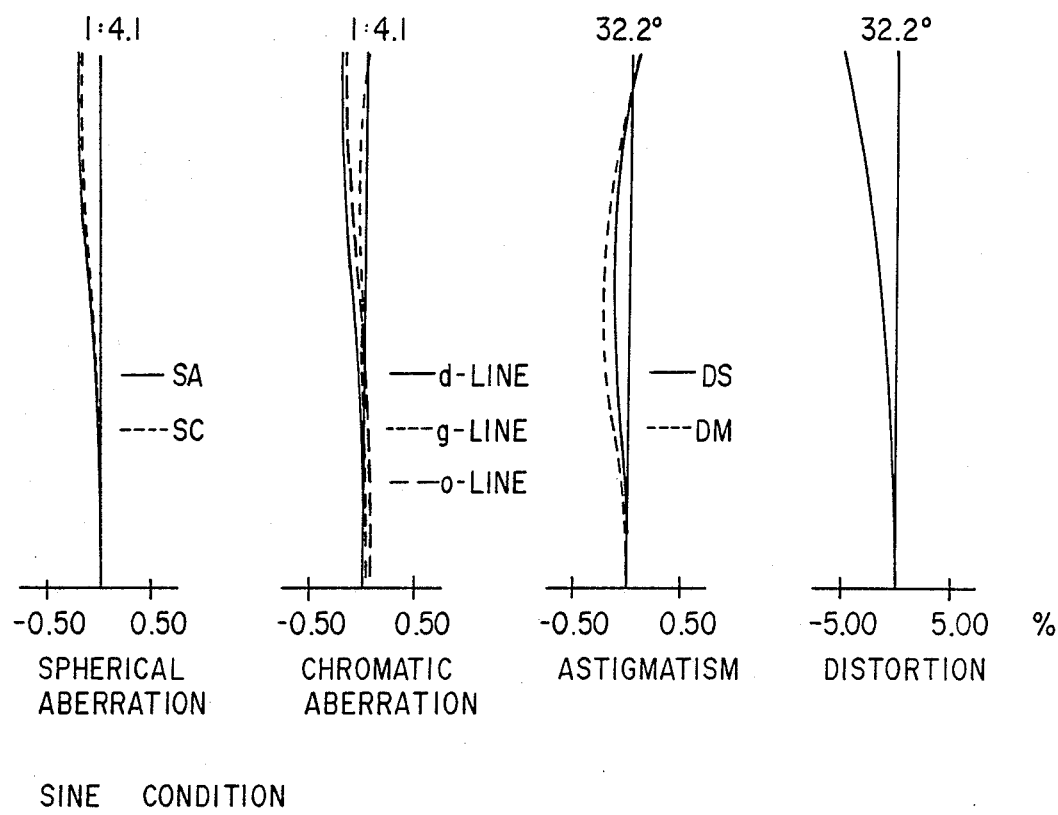

ZOOM LENS

BACKGROUND OF THE INVENTION

The present invention relates to a zoom lens of a compact size composed of seven elements in seven groups divided into a front group having a negative refracting power and a rear group having a positive refracting power.

There have heretofore been known zoom lenses comprising seven elements in seven groups divided into a front group having a negative refracting power and a rear group having a positive. refracting power as disclosed in Japanese Patent Publication No. 55-13334 and Japanese earlier Publication No. 56-43619, for example The known zoom lenses are designated with an iris diaphragm mechanism incorporated in a space between lenses in the rear group.

With such diaphragm design, the lens groups positioned forward and rearward of the iris diaphragm mechanism have to be coupled together across the iris diaphragm mechanism sandwiched therebetween, and hence the lens barrel is complex in construction. This is disadvantageous in point of lens assembly.

If an aperture is positioned in front of the rear group, then the rear group can be unitized as a whole. Such an arrangement aids in point of lens barrel construction, lens assembly, and cost. However, since a space is needed between the front and rear groups for accommodating the iris diaphragm mechanism therein, the lens cannot be rendered compact in size.

SUMMARY OF THE INVENTION

It is an object of the present invention to provide a zoom lens composed of seven elements in seven groups which is compact in size and of good performance, and which has a lens barrel of a simple construction and can be assembled with ease.

According to the present invention, a zoom lens system is compact in size and of good performance, and has an entire lens length of about 1.5 $f_T$ from an image plane at a maximum focal length with an aperture located in front of the rear group through giving the lens system a suitable power arrangement and shape.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1, 5, and 9 are schematic views of the arrangements of zoom lenses according to Examples 1, 2, and 3, respectively, of the present invention;

FIGS. 2, 3, and 4 are diagrams showing aberrations of the zoom lens according to Example 1 at minimum, medium, and maximum focal lengths, respectively;

FIGS. 10, 11, and 12 are diagrams showing aberrations of the zoom lens according to Example 3 at minimum, medium, and maximum focal lengths, respectively.

DESCRIPTION OF THE PREFERRED EMBODIMENT

Figure 1:
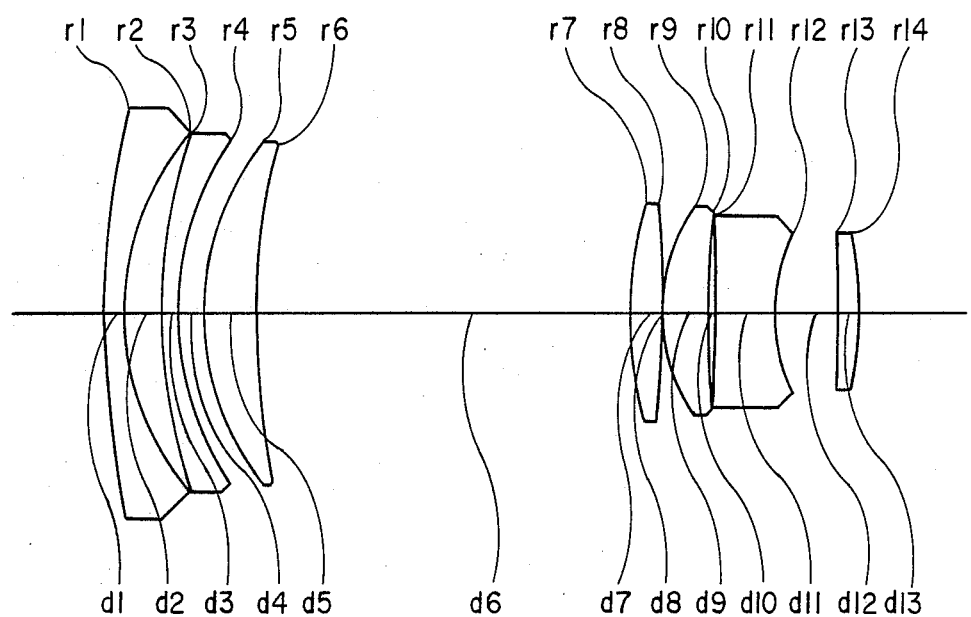
Figure 2:
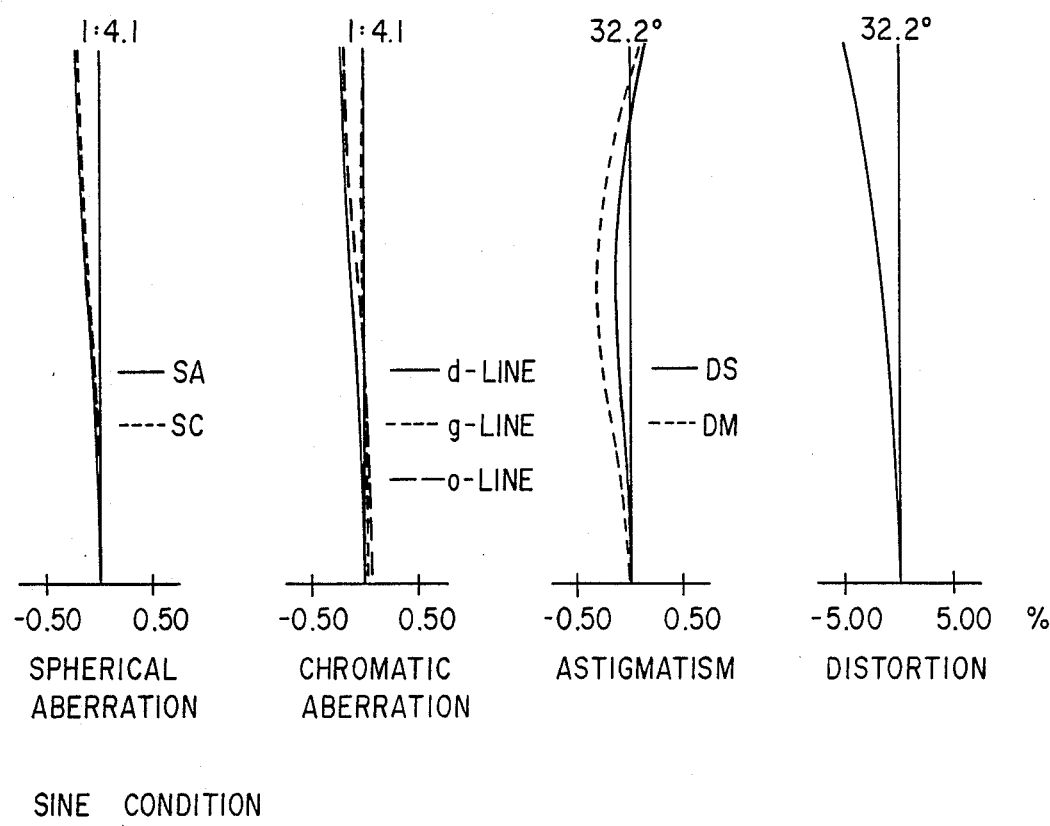
Figure 5:
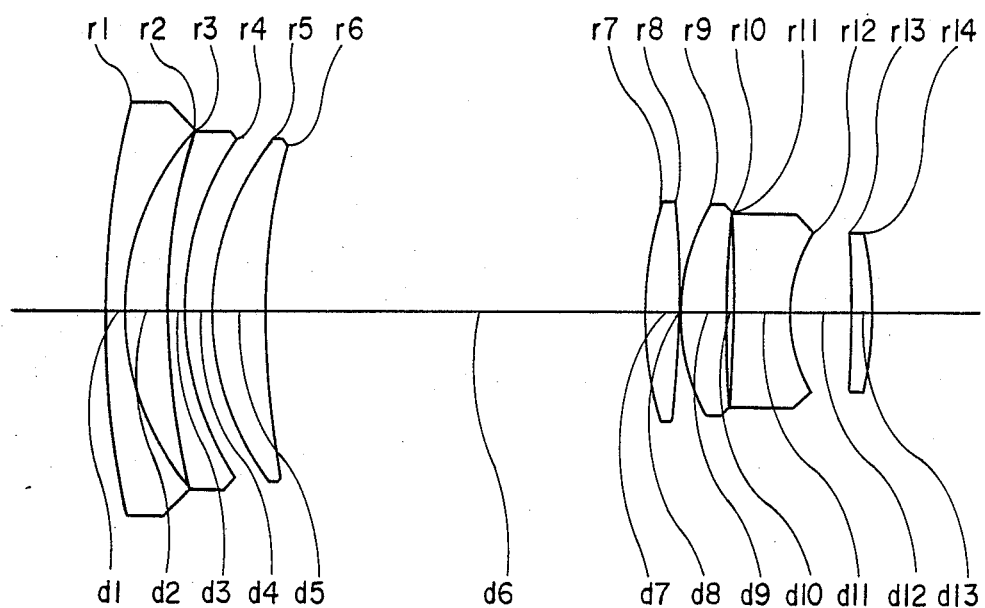
Figure 6:
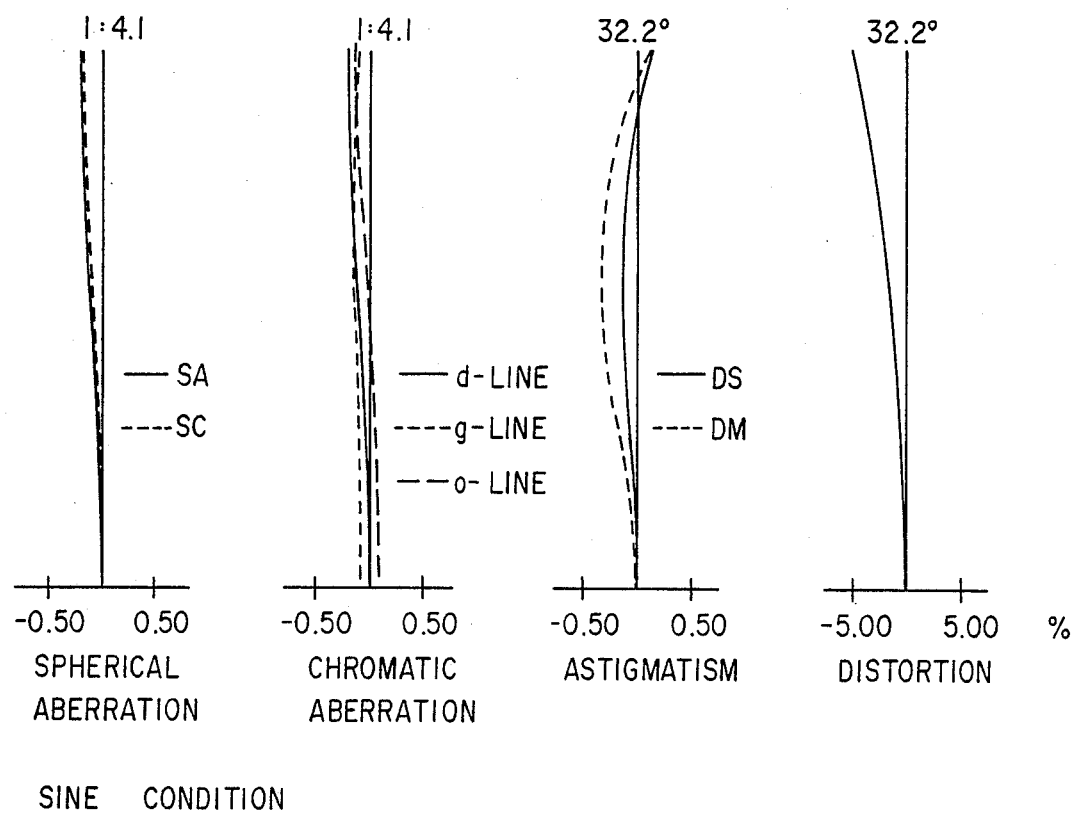
FIGS. 6, 7, and 8 are diagrams showing aberrations of the zoom lens according to Example 2 at minimum, medium, and maximum focal lengths, respectively.
Figure 7:
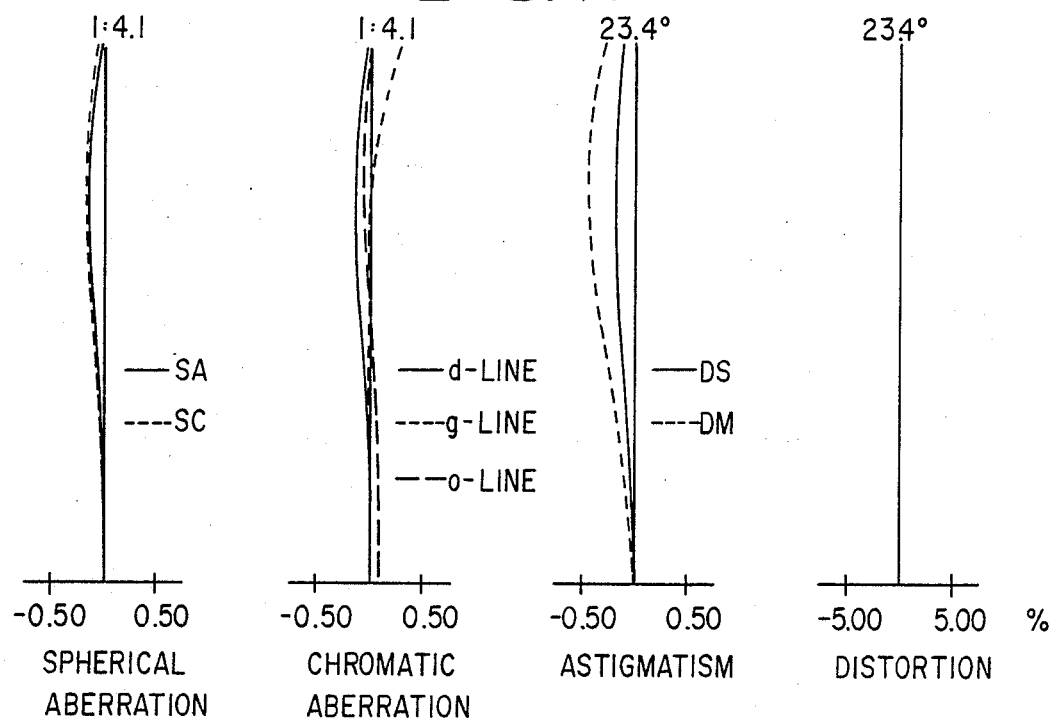
Figure 8:
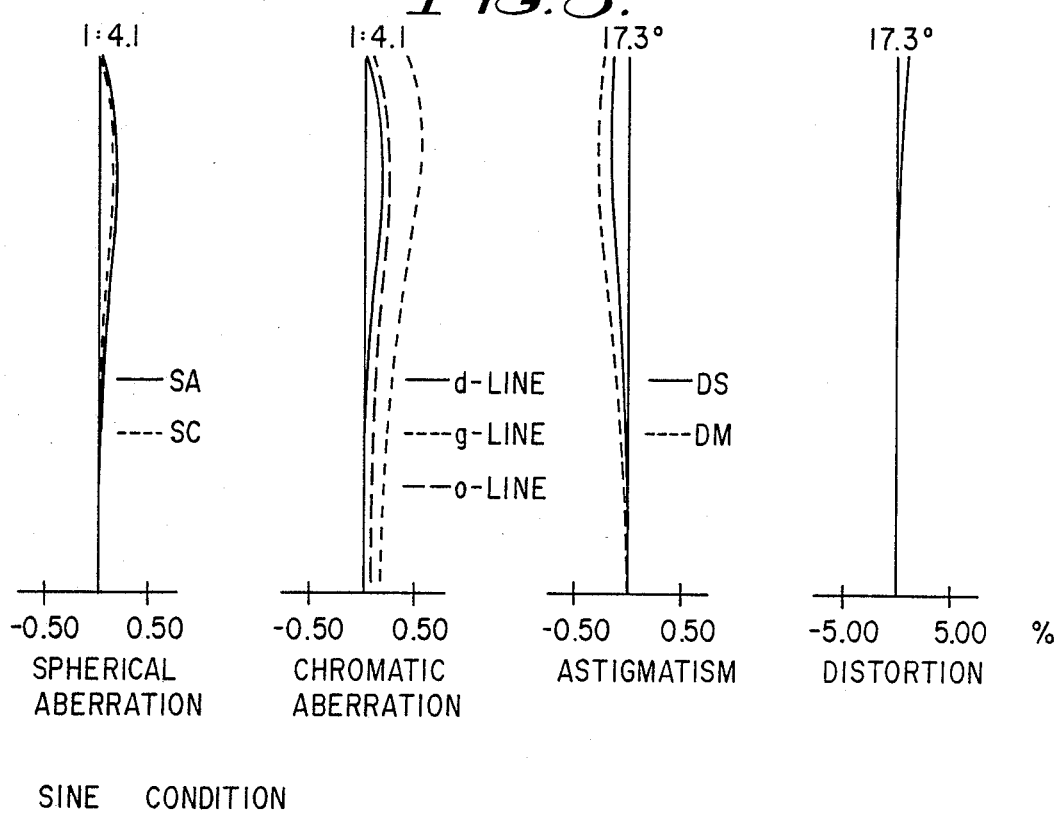
Figure 11:
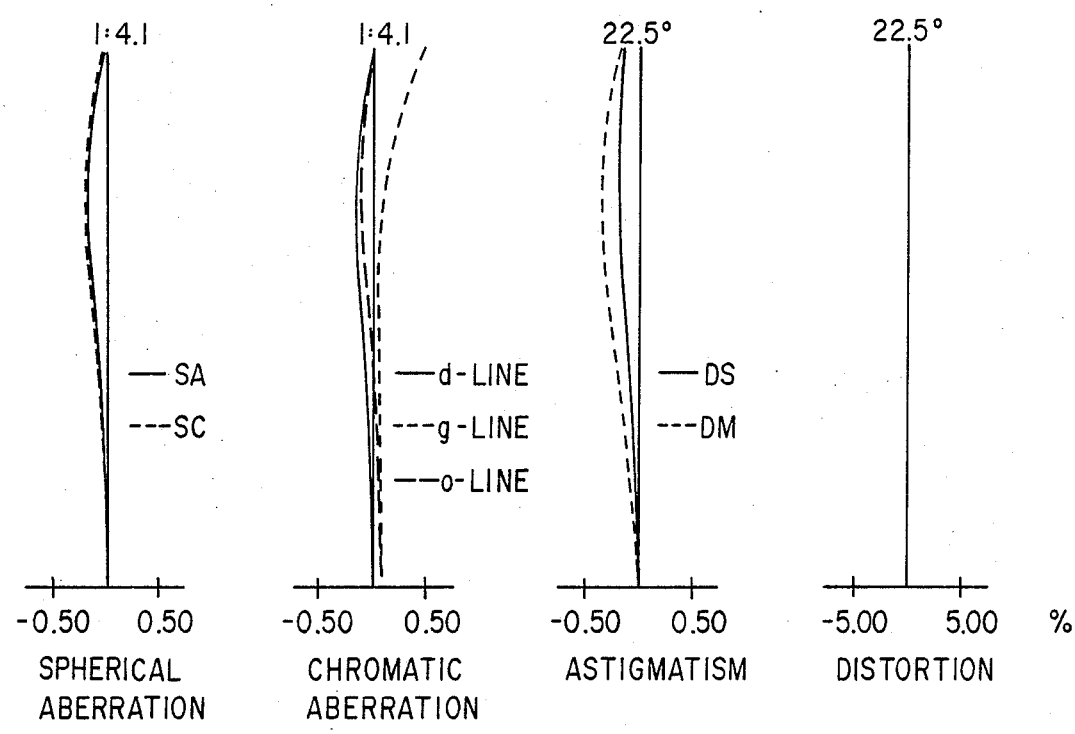
Figure 12:
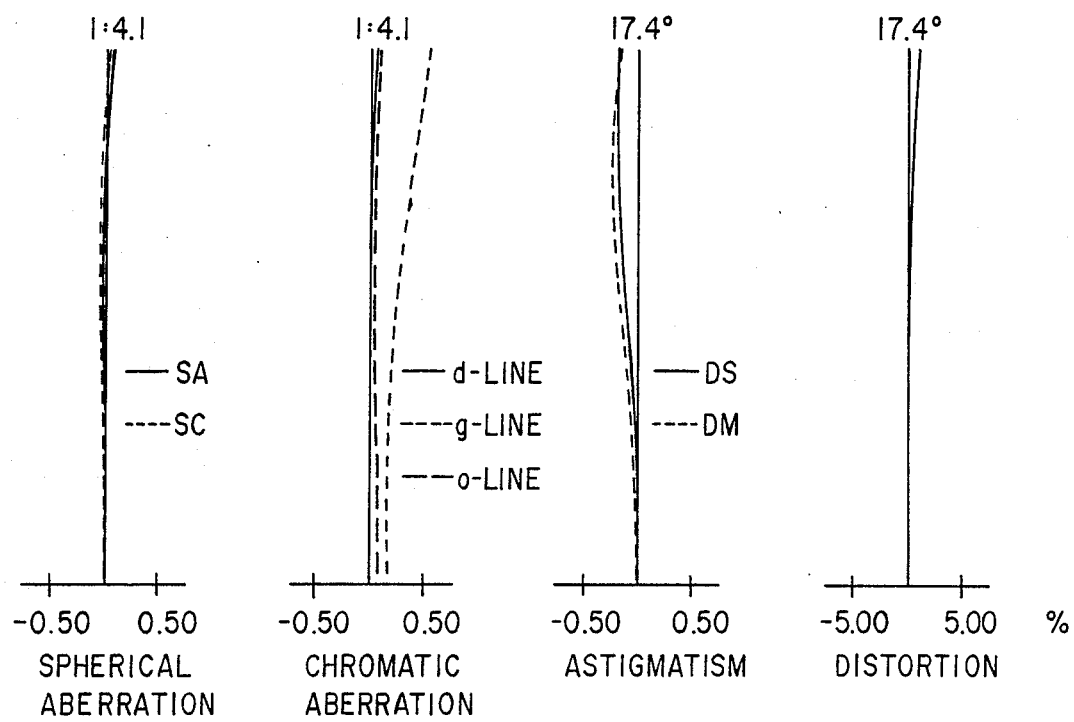

A zoom lens according to the present invention comprises a front diverging lens group and a rear converging leng group which are mechanically movable for variable power, the front diverging lens comprising a first lens of negative meniscus which is convex toward an object, a second negative lens, and a third lens of positive meniscus which is convex toward the object, the rear converging lens comprising a fourth positive lens, a fifth positive lens, a sixth negative lens, and a seventh positive lens, there being an aperture disposed more closely than the rear group to the object and movable with the rear group, the zoom lens satisfying the following conditions:

$$\frac{1}{f1,2 \left( \frac{1}{n1 f1} + \frac{1}{n1 f1} \right)} > 1.80 \quad (1)$$

$$1.20 > \frac{|f_I|}{f_T} > 0.90 \quad (2)$$

$$1.10 > \frac{f3}{|f_I|} > 0.75 \quad (3)$$

$$0.55 > \frac{|f6|}{f_{II}} > 0.35 \quad (4)$$

$$0.050 > \frac{l_2}{f_T} > 0.025 \quad (5)$$

$$0.25 > \frac{e}{f_T} > 0.15 \quad (6)$$

where
- $f_T$: the combined focal length of the entire lens system at a maximum focal length,
- $f_I$: the combined focal length of the front group,
- $f_{II}$: the combined focal length of the rear group,
- f1, 2: the combined focal length from the first to the second lens,
- f1, f2, f3, f6: the focal lengths of the first, second, third, and sixth lenses,
- n1, n2: the refractive indexes of the first and second lenses with respect to d-line,
- l2: the air gap between the second and third lenses,
- and e: the distance between a principal point of the front group closer to the image and a principal point of the rear group closer to the object at a maximum focal length.

The foregoing conditions will be described.

The condition (1) is imposed on the relationship between the power distribution between the two negative lenses in the front group and the refractive indexes thereof. If the condition (1) were not met, then the negative deviation of a Petzval sum produced by the these negative lenses would become excessive. If this negative deviation were cancelled out by a positive Petzval sum produced by the other positive lens for the correction of image plane curvature, then it would be rendered difficult to correct spherical aberration and coma generated by the positive lens.

The condition (2) is imposed for making the lens system compact and achieving good aberration correction. If the lower limit of the condition (2) were exceeded, then the power of each lens in the front group would be so large as to produce spherical aberration and coma of higher order which are not preferable for higher lens performance, and the powers of the negative lenses in the front group would be so large as to produce a large negative distortion which could not be compensated for by the other lens. If the upper limit of the condition (2) were exceeded, then aberrations could be better corrected, but the distance between the front and rear groups at a maximum focal length would become large to increase the overall lens length, and the diameter of the front lens would be large for maintaining a sufficient amount of light up to a maximum angle of view, an obstacle to a more compact lens construction.

The conditions (3), (4) are imposed on the third positive lens in the front group and the sixth negative lens in the rear group for the balanced correction of aberrations.

If the lower limit of the condition (3) were exceeded, then the powers of the negative lenses in the front group would become excessively large in order to maintain the negative power of the front group, resulting in a large negative distortion. It would also be difficult to correct coma and astigmatism. If the upper limit of the condition (3) were exceeded, then the capability for the positive Petzval sum produced by the third positive lens in the front group to correct the negative Petzval sum produced by the negative lenses in the front group would be lowered, and the entire negative Petzval sum of the front group would be too large to correct image plane curvature.

If the lower limit of the condition (4) were exceeded, then the powers of the positive lenses in the rear group would become excessively large in order to maintain the negative power of the front group. This would increase an unwanted variation in aberrations, particularly spherical aberration, due to zooming. If the upper limit of the condition (4) were exceeded, then the capability for the negative Petzval sum produced by the sixth negative lens in the rear group to correct the positive Petzval sum produced by the positive lenses in the rear group would be reduced, and the overall positive Petzval sum of the rear group would be too large to correct image plane curvature.

The condition (5) is imposed on the air gap between the second and third lenses. If the lower limit of the condition (5) were exceeded, then the lens system would be more compact in size, but it would be difficult to correct spherical aberration and coma in a balanced manner at a maximum focal length. If the upper limit of the condition (5) were exceeded, then the overall length of the lens system would be increased, and the diameter of the front lens would be large for maintaining a sufficient brightness at the edge of an image field at a minimum focal length. This would present an obstacle to a more compact lens construction.

The condition (6) is imposed on the distance between a principal point of the front group closer to the image and a principal point of the rear group closer to the object at a maximum focal length. If the lower limit of the condition (6) were exceeded, then no space would be available for placing an iris diaphragm mechanism in front of the rear group. If the upper limit of the condition (6) were exceeded, then the entire lens length would be increased, and the diameter of the front lens would be large for maintaining a sufficient brightness at the edge of an image field at a minimum focal length, an obstacle to a compact lens construction.

Examples of the present invention will be described. Designated in lens data at ri is an ith radius of curvature as counted from the object, di an ith inter-surface distance as counted from the object, n a refractive index with respect to d-line, and $\nu$ an Abbe number.

[EXAMPLE 1]

F = 36-68.5    F number 1:4.1
Angle of view $2\omega$ = 64.4°-34.6°

| | ri | di | n | $\nu$ |
|---|---|---|---|---|
| 1 | 99.624 | 1.980 | 1.80610 | 40.9 |
| 2 | 28.483 | 3.806 | | |
| 3 | 57.036 | 1.880 | 1.80440 | 39.6 |
| 4 | 30.041 | 2.645 | | |
| 5 | 29.662 | 5.459 | 1.80518 | 25.4 |
| 6 | 71.946 | 38.826-4.256 | | |
| 7 | 38.060 | 3.583 | 1.69350 | 50.8 |
| 8 | −134.118 | 0.100 | | |
| 9 | 21.700 | 4.890 | 1.69350 | 50.8 |
| 10 | 225.222 | 0.560 | | |
| 11 | −218.543 | 6.040 | 1.80518 | 25.4 |
| 12 | 16.260 | 6.682 | | |
| 13 | −256.292 | 2.131 | 1.64769 | 33.8 |
| 14 | −37.060 | | | |

$$\frac{1}{f1,2\left(\frac{1}{n1\ f1} + \frac{1}{n2\ f2}\right)} = 1.883$$

$$\frac{|f_I|}{f_T} = 0.963$$

$$\frac{f3}{|f_I|} = 0.899$$

$$\frac{|f6|}{f_{II}} = 0.467$$

$$\frac{l_2}{f_T} = 0.039$$

$$\frac{e}{f_T} = 0.177$$

[EXAMPLE 2]

F = 36-68.5    F number 1:4.1
Angle of view $2\omega$ = 64.4°-34.6°

| | ri | di | n | $\nu$ |
|---|---|---|---|---|
| 1 | 103.259 | 1.980 | 1.74400 | 44.7 |
| 2 | 27.613 | 4.316 | | |
| 3 | 61.861 | 1.880 | 1.74950 | 35.3 |
| 4 | 30.868 | 2.886 | | |
| 5 | 29.874 | 5.415 | 1.76182 | 26.6 |
| 6 | 72.468 | 39.031-4.243 | | |
| 7 | 39.784 | 3.505 | 1.72000 | 50.3 |
| 8 | −131.754 | 0.100 | | |
| 9 | 21.700 | 5.038 | 1.66892 | 45.0 |
| 10 | 238.059 | 0.589 | | |
| 11 | −195.355 | 6.040 | 1.80518 | 25.4 |
| 12 | 16.599 | 6.228 | | |
| 13 | −217.297 | 2.239 | 1.58144 | 40.8 |
| 14 | −33.020 | | | |

$$\frac{1}{f1,2\left(\frac{1}{n1\ f1} + \frac{1}{n2\ f2}\right)} = 1.825$$

$$\frac{|f_I|}{f_T} = 0.959$$

$$\frac{f3}{|f_I|} = 0.962$$

-continued

F = 36–68.5    F number 1:4.1
Angle of view 2ω = 64.4°–34.6°

| ri | di | n | ν |
|----|----|---|---|

$$\frac{|f6|}{f_{II}} = 0.467$$

$$\frac{l_2}{f_T} = 0.042$$

$$\frac{e}{f_T} = 0.189$$

[EXAMPLE 3]

F = 36–68.5    F number 1:4.1
Angle of view 2ω = 64.5°–34.7°

|   | ri | di | n | ν |
|---|----|----|---|---|
| 1 | 93.720 | 1.980 | 1.83400 | 37.2 |
| 2 | 28.700 | 4.240 | | |
| 3 | 69.120 | 1.880 | 1.80610 | 40.9 |
| 4 | 33.150 | 2.950 | | |
| 5 | 31.885 | 5.370 | 1.80518 | 25.4 |
| 6 | 89.072 | 41.111–3.821 | | |
| 7 | 39.600 | 3.500 | 1.74400 | 44.7 |
| 8 | −132.321 | 0.100 | | |
| 9 | 21.200 | 4.040 | 1.65844 | 50.9 |
| 10 | 193.485 | 0.640 | | |
| 11 | −206.849 | 6.040 | 1.80518 | 25.4 |
| 12 | 16.570 | 6.700 | | |
| 13 | −92.459 | 2.230 | 1.58144 | 40.8 |
| 14 | −28.475 | | | |

$$\frac{1}{f1,2\left(\frac{1}{n1\,f1} + \frac{1}{n2\,f2}\right)} = 1.904$$

$$\frac{|f_I|}{f_T} = 0.999$$

$$\frac{f3}{|f_I|} = 0.865$$

$$\frac{|f6|}{f_{II}} = 0.455$$

$$\frac{l_2}{f_T} = 0.043$$

$$\frac{e}{f_T} = 0.207$$

Although a certain preferred embodiment has been shown and described, it should be understood that many changes and modifications may be made therein without departing from the scope of the appended claim.

What is claimed is:

1. A zoom lens comprising a front diverging lens group and a rear converging leng group which are mechanically movable for variable power, said front diverging lens comprising a first lens of negative meniscus which is convex toward an object, a second negative lens, and a third lens of positive meniscus which is convex toward the object, said rear converging lens comprising a fourth positive lens, a fifth positive lens, a sixth negative lens, and a seventh positive lens, there being an aperture disposed more closely than said rear group to the object and movable with said rear group, said zoom lens satisfying the following conditions:

$$\frac{1}{f1,2\left(\frac{1}{n1\,f1} + \frac{1}{n1\,f1}\right)} > 1.80 \quad (1)$$

$$1.20 > \frac{|f_I|}{f_T} > 0.90 \quad (2)$$

$$1.10 > \frac{f3}{|f_I|} > 0.75 \quad (3)$$

$$0.55 > \frac{|f6|}{f_{II}} > 0.35 \quad (4)$$

$$0.050 > \frac{l_2}{f_T} > 0.025 \quad (5)$$

$$0.25 > \frac{e}{f_T} > 0.15 \quad (6)$$

where
  $f_T$: the combined focal length of the entire lens system at a maximum focal length,
  $f_I$: the combined focal length of the front group,
  $f_{II}$: the combined focal length of the rear group,
  f1, 2: the combined focal length from the first to the second lens,
  f1, f2, f3, f6: the focal lengths of the first, second, third, and sixth lenses,
  n1, n2: the refractive indexes of the first and second lenses with respect to d-line,
  l2: the air gap between the second and third lenses, and
  e: the distance between a principal point of the front group closer to the image and a principal point of the rear group closer to the object at a maximum focal length, and wherein F = 36–68.5    F number 1:4.1
Angle of view 2ω = 64.4°–34.6°

|   | ri | di | n | ν |
|---|----|----|---|---|
| 1 | 99.624 | 1.980 | 1.80610 | 40.9 |
| 2 | 28.483 | 3.806 | | |
| 3 | 57.036 | 1.880 | 1.80440 | 39.6 |
| 4 | 30.041 | 2.645 | | |
| 5 | 29.662 | 5.459 | 1.80518 | 25.4 |
| 6 | 71.946 | 38.826–4.256 | | |
| 7 | 38.060 | 2.583 | 1.69350 | 50.8 |
| 8 | −134.118 | 0.100 | | |
| 9 | 21.700 | 4.890 | 1.69350 | 50.8 |
| 10 | 225.222 | 0.560 | | |
| 11 | −218.543 | 6.040 | 1.80518 | 25.4 |
| 12 | 16.260 | 6.682 | | |
| 13 | −256.292 | 2.131 | 1.64769 | 33.8 |
| 14 | −37.060 | | | |

$$\frac{1}{f1,2\left(\frac{1}{n1\,f1} + \frac{1}{n2\,f2}\right)} = 1.883$$

$$\frac{|f_I|}{f_T} = 0.963$$

$$\frac{f3}{|f_I|} = 0.899$$

$$\frac{|f6|}{f_{II}} = 0.467$$

$$\frac{l_2}{f_T} = 0.039$$

-continued

| F = 36–68.5 | F number 1:4.1 |
| Angle of view 2ω = 64.4°–34.6° | | | |
| ri | di | n | ν |
|---|---|---|---|
| $\dfrac{e}{f_T} = 0.177.$ | | | |

2. A zoom lens comprising a front diverging lens group and a rear converging leng group which are mechanically movable for variable power, said front diverging lens comprising a first lens of negative meniscus which is convex toward on object, a second negative lens, and a third lens of positive meniscus which is convex toward the object, said rear converging lens comprising a fourth positive lens, a fifth positive lens, a sixth negative lens, and a seventh positive lens, there being an aperture disposed more closely than said rear group to the object and movable with said rear group, said zoom lens satisfying the following conditions:

$$\frac{1}{f1,2\left(\dfrac{1}{n1\,f1}+\dfrac{1}{n1\,f1}\right)} > 1.80 \quad (1)$$

$$1.20 > \frac{|f_I|}{f_T} > 0.90 \quad (2)$$

$$1.10 > \frac{f3}{|f_I|} > 0.75 \quad (3)$$

$$0.55 > \frac{|f6|}{f_{II}} > 0.35 \quad (4)$$

$$0.050 > \frac{l_2}{f_T} > 0.025 \quad (5)$$

$$0.25 > \frac{e}{f_T} > 0.15 \quad (6)$$

where
- $f_T$: the combined focal length of the entire lens system at a maximum focal length,
- $f_I$: the combined focal length of the front group,
- $f_{II}$: the combined focal length of the rear group,
- f1, 2: the combined focal length from the first to the second lens,
- f1, f2, f3, f6: the focal lengths of the first third, and sixth lenses,
- n1, n2: the refractive indexes of the first and second lenses with respect to d-line, and
- l2: the air gap between the second and third lenses,
- e: the distance between a principal point of the front group closer to the image and a principal point of the rear group closer to the object at a maximum focal length, and wherein

| F = 36–68.5 | F number 1:4.1 | | |
| Angle of view 2ω = 64.4°–34.6° | | | |
| ri | di | n | ν |
|---|---|---|---|
| 1 | 103.259 | 1.980 | 1.74400 | 44.7 |
| 2 | 27.613 | 4.316 | | |
| 3 | 61.861 | 1.880 | 1.74950 | 35.3 |
| 4 | 30.868 | 2.886 | | |
| 5 | 29.874 | 5.415 | 1.76182 | 26.6 |
| 6 | 72.468 | 39.031–4.243 | | |
| 7 | 39.784 | 3.505 | 1.72000 | 50.3 |
| 8 | −131.754 | 0.100 | | |
| 9 | 21.700 | 5.038 | 1.66892 | 45.0 |
| 10 | 238.059 | 0.589 | | |

-continued

| F = 36–68.5 | F number 1:4.1 | | |
| Angle of view 2ω = 64.4°–34.6° | | | |
| ri | di | n | ν |
|---|---|---|---|
| 11 | −193.355 | 6.040 | 1.80518 | 25.4 |
| 12 | 16.599 | 6.228 | | |
| 13 | −217.297 | 2.239 | 1.58144 | 40.8 |
| 14 | −33.020 | | | |

$$\frac{1}{f1,2\left(\dfrac{1}{n1\,f1}+\dfrac{1}{n2\,f2}\right)} = 1.825$$

$$\frac{|f_I|}{f_T} = 0.959$$

$$\frac{f3}{|f_I|} = 0.962$$

$$\frac{|f6|}{f_{II}} = 0.467$$

$$\frac{l_2}{f_T} = 0.042$$

$$\frac{e}{f_T} = 0.189.$$

3. A zoom lens comprising a front diverging lens group and a rear converging leng group which are mechanically movable for variable power, said front diverging lens comprising a first lens of negative meniscus which is convex toward an object, a second negative lens, and a third lens of positive meniscus which is convex toward the object, said rear converging lens comprising a fourth positive lens, a fifth positive lens, a sixth negative lens, and a seventh positive lens, there being an aperture disposed more closely than said rear group to the object and movable with said rear group, said zoom lens satisfying the following conditions:

$$\frac{1}{f1,2\left(\dfrac{1}{n1\,f1}+\dfrac{1}{n1\,f1}\right)} > 1.80 \quad (1)$$

$$1.20 > \frac{|f_I|}{f_T} > 0.90 \quad (2)$$

$$1.10 > \frac{f3}{|f_I|} > 0.75 \quad (3)$$

$$0.55 > \frac{|f6|}{f_{II}} > 0.35 \quad (4)$$

$$0.050 > \frac{l_2}{f_T} > 0.025 \quad (5)$$

$$0.25 > \frac{e}{f_T} > 0.15 \quad (6)$$

where
- $f_T$: the combined focal length of the entire lens system at a maximum focal length,
- $f_I$: the combined focal length of the front group,
- $f_{II}$: the combined focal length of the rear group,
- f1, 2: the combined focal length from the first to the second lens,
- f1, f2, f3, f6: the focal lengths of the first, second, third, and sixth lenses,
- n1, n2: the refractive indexes of the first and second lenses with respect to d-line, 12: the air gap between the second and third lenses, and e: the distance between a principal point of the front group closer to the image and a principal point of the rear group closer to the object at a maximum focal length, and wherein

| | F = 36–68.5 | F number 1:4.1 | | |
|---|---|---|---|---|
| | Angle of view 2ω = 64.5°–34.7° | | | |
| | ri | di | n | ν |
| 1 | 93.720 | 1.980 | 1.83400 | 37.2 |
| 2 | 28.700 | 4.240 | | |
| 3 | 69.120 | 1.880 | 1.80610 | 40.9 |
| 4 | 33.150 | 2.950 | | |
| 5 | 31.885 | 5.370 | 1.80518 | 25.4 |
| 6 | 89.072 | 41.111–3.821 | | |
| 7 | 39.600 | 3.500 | 1.74400 | 44.7 |
| 8 | −132.321 | 0.100 | | |
| 9 | 21.200 | 4.040 | 1.65844 | 50.9 |
| 10 | 193.485 | 0.640 | | |
| 11 | −206.849 | 6.040 | 1.80518 | 25.4 |
| 12 | 16.570 | 6.700 | | |

-continued

| | F = 36–68.5 | F number 1:4.1 | | |
|---|---|---|---|---|
| | Angle of view 2ω = 64.5°–34.7° | | | |
| | ri | di | n | ν |
| 13 | −92.459 | 2.230 | 1.58144 | 40.8 |
| 14 | −28.475 | | | |

$$\frac{1}{f_{1,2}\left(\frac{1}{n_1 f_1} + \frac{1}{n_2 f_2}\right)} = 1.904$$

$$\frac{|f_I|}{f_T} = 0.999$$

$$\frac{f_3}{|f_I|} = 0.865$$

$$\frac{|f_6|}{f_{II}} = 0.455$$

$$\frac{l_2}{f_T} = 0.043$$

$$\frac{e}{f_T} = 0.207.$$

* * * * *